(12) United States Patent
Kim et al.

(10) Patent No.: US 11,329,314 B2
(45) Date of Patent: May 10, 2022

(54) LITHIUM ION CONDUCTIVE SULFIDE-BASED SOLID ELECTROLYTE WITH CONTROLLED HALOGEN ELEMENTS CONTENT AND METHOD OF PREPARING THE SAME

(71) Applicant: KOREA INSTITUTE OF SCIENCE AND TECHNOLOGY, Seoul (KR)

(72) Inventors: Hyoung chul Kim, Seoul (KR); Byung Kook Kim, Seoul (KR); Hun Gi Jung, Seoul (KR); Kyung Yoon Chung, Seoul (KR); Jong Ho Lee, Seoul (KR); Hae Weon Lee, Seoul (KR); Ji Won Son, Seoul (KR); Eu Deum Jung, Seoul (KR); Ji Su Kim, Seoul (KR); Sung Jun Choi, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 365 days.

(21) Appl. No.: 16/596,659

(22) Filed: Oct. 8, 2019

(65) Prior Publication Data
US 2020/0358131 A1    Nov. 12, 2020

(30) Foreign Application Priority Data
May 8, 2019  (KR) .................. 10-2019-0053552

(51) Int. Cl.
| | |
|---|---|
| *H01M 4/02* | (2006.01) |
| *H01M 10/0562* | (2010.01) |
| *H01M 10/0525* | (2010.01) |
| *C01B 25/14* | (2006.01) |

(52) U.S. Cl.
CPC ......... *H01M 10/0562* (2013.01); *C01B 25/14* (2013.01); *H01M 10/0525* (2013.01); *C01P 2002/72* (2013.01); *C01P 2002/82* (2013.01); *C01P 2002/86* (2013.01); *C01P 2006/40* (2013.01); *H01M 2300/008* (2013.01)

(58) Field of Classification Search
CPC ....................................................... H01M 4/02
See application file for complete search history.

(56) References Cited

U.S. PATENT DOCUMENTS

| | | | |
|---|---|---|---|
| 9,899,701 B2 | 2/2018 | Miyashita et al. | |
| 2013/0189616 A1* | 7/2013 | Vong ..................... | G03G 5/047 430/135 |
| 2019/0074544 A1* | 3/2019 | Senga ............... | H01M 10/0562 |

(Continued)

FOREIGN PATENT DOCUMENTS

| | | |
|---|---|---|
| JP | 2014-102997 A | 6/2014 |
| JP | 5873533 B2 | 1/2016 |
| KR | 10-1917019 B1 | 11/2018 |

(Continued)

*Primary Examiner* — Jacob B Marks
(74) *Attorney, Agent, or Firm* — Goldilocks Zone IP Law

(57) ABSTRACT

Disclosed are a sulfide-based solid electrolyte imparted with improved lithium ion conductivity and a method of preparing the same. More particularly, disclosed is a sulfide-based solid electrolyte containing a lithium element (Li), a phosphorus element (P), a sulfur element (S) and a halogen element (X), and including a crystal phase of an argyrodite crystal structure, wherein a molar ratio (X/P) of the halogen element (X) to the phosphorus element (P) is higher than 1.

19 Claims, 10 Drawing Sheets

(56) References Cited

U.S. PATENT DOCUMENTS

2019/0319305 A1\* 10/2019 Utsuno ................. C03C 3/23

FOREIGN PATENT DOCUMENTS

| KR | 10-2019-0007028 A | 1/2019 |
| KR | 10-1952196 B1 | 2/2019 |
| WO | 2018-092366 A1 | 5/2018 |
| WO | WO 2018-092366 \* | 5/2018 |

\* cited by examiner

FIG. 5
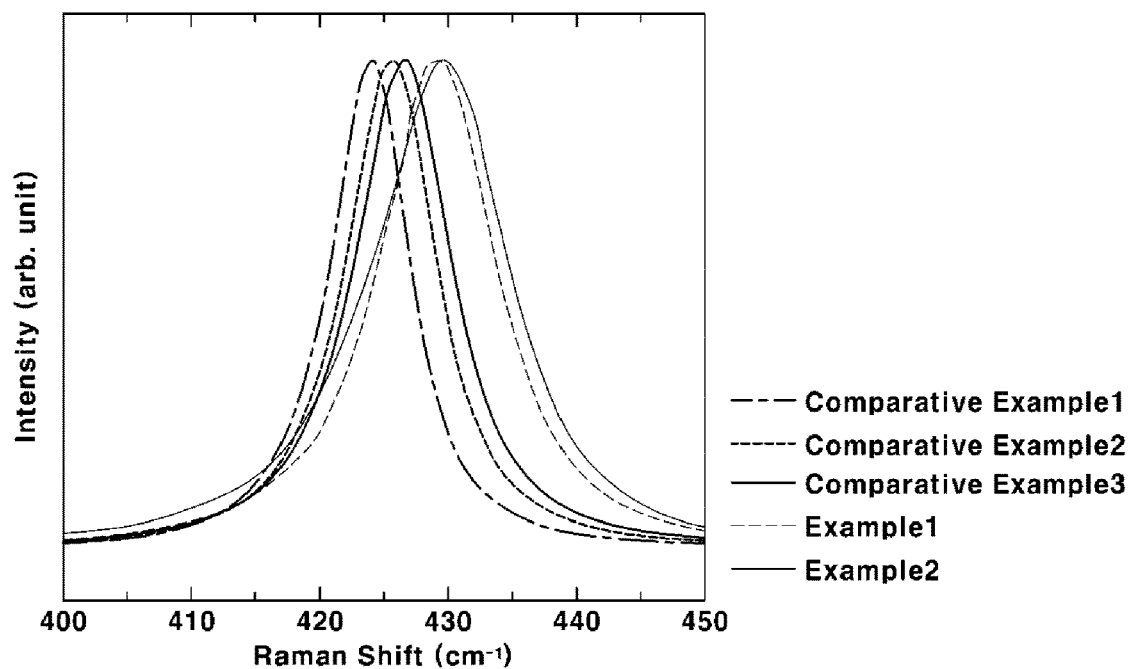
FIG.5A
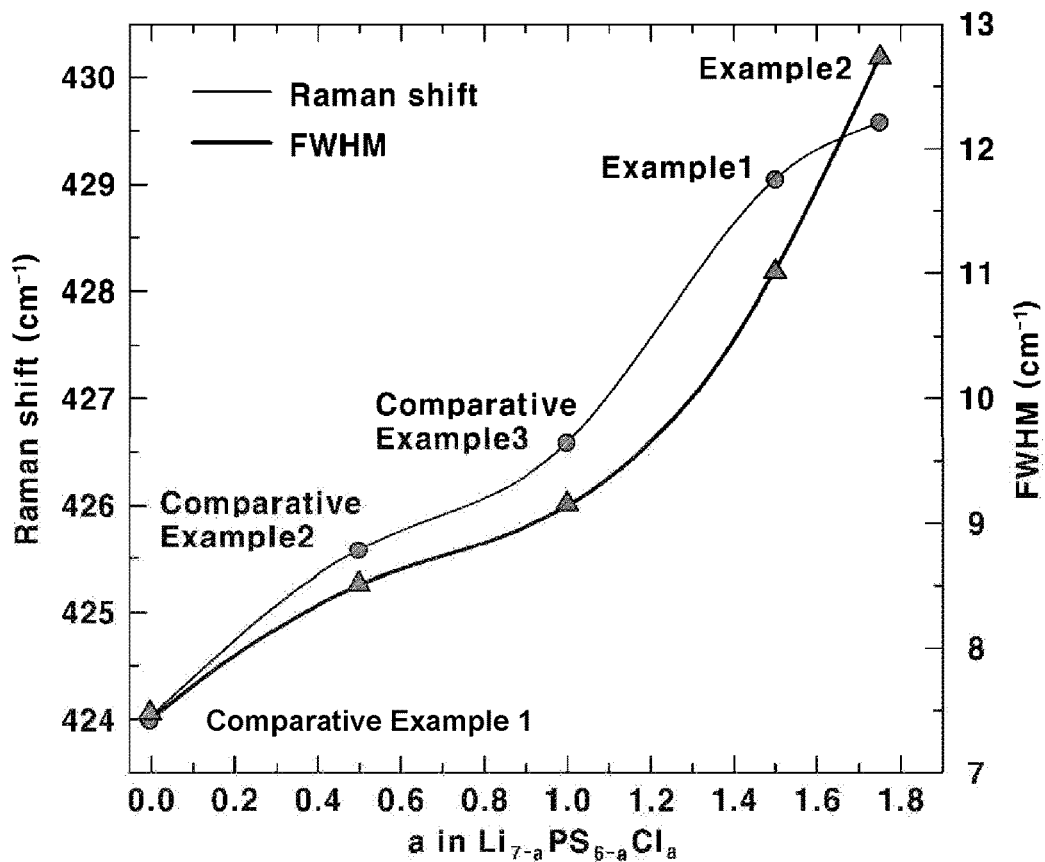
FIG. 5B

FIG. 6
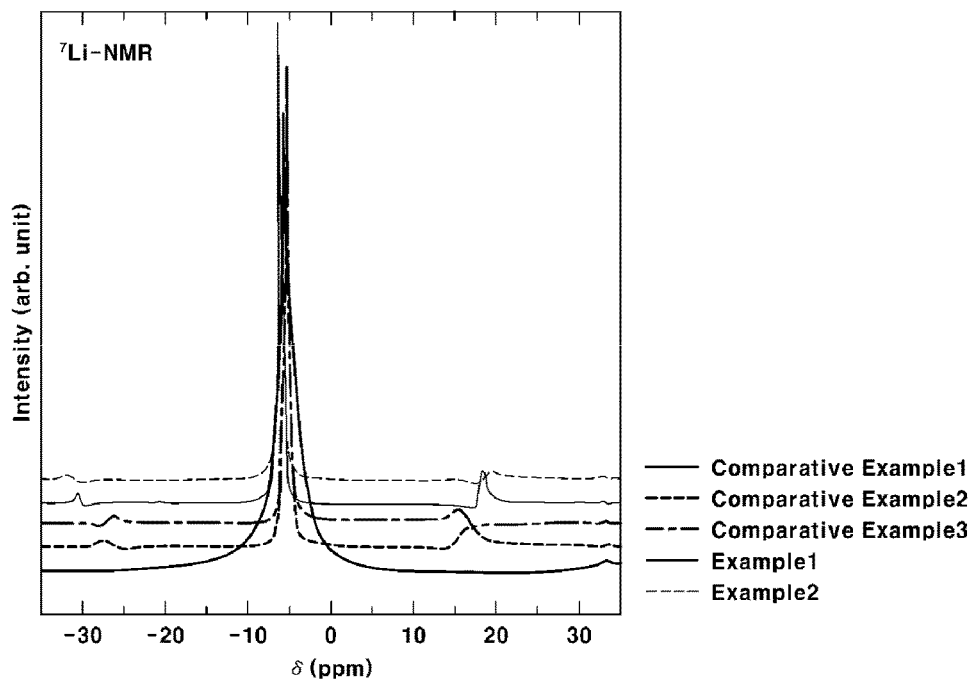
FIG. 6A
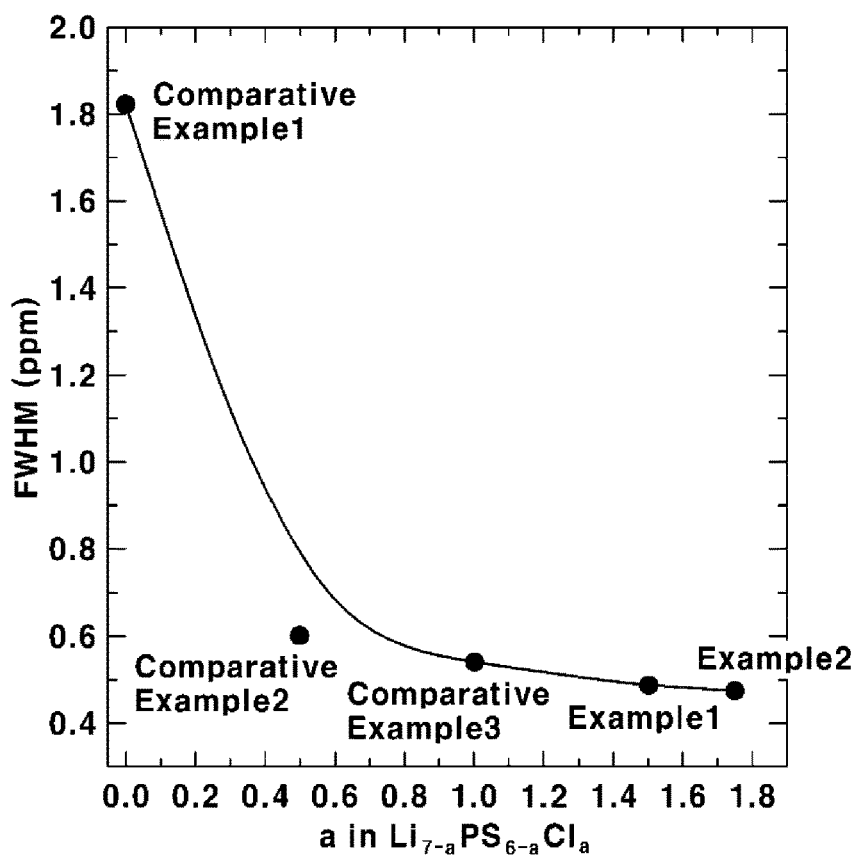
FIG. 6B

FIG. 7
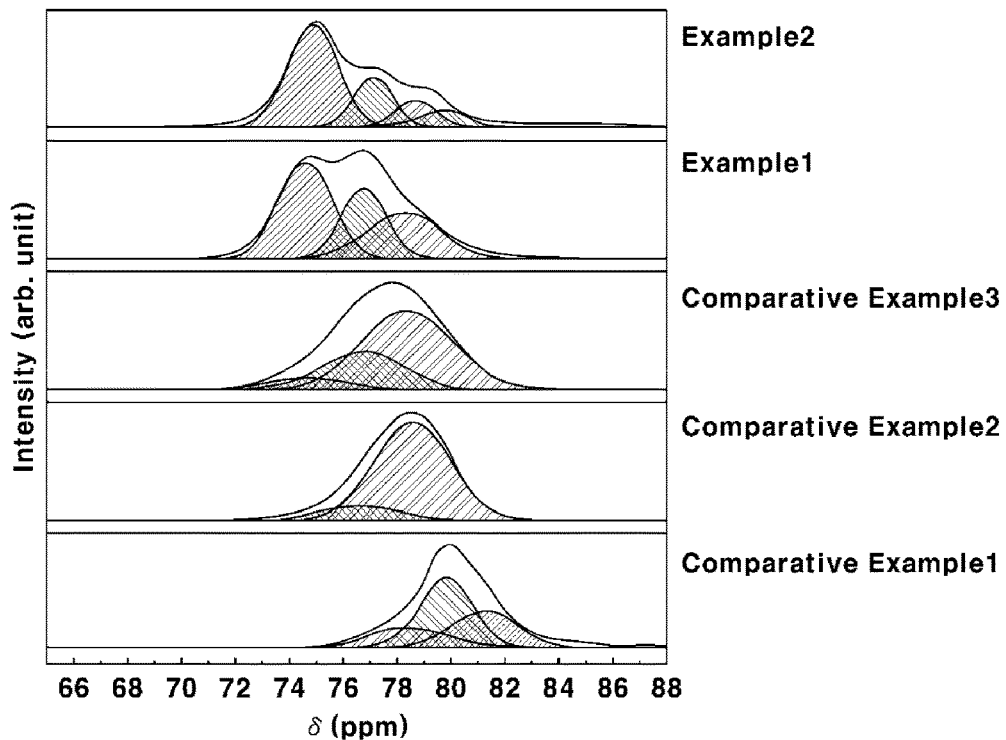
FIG. 7A
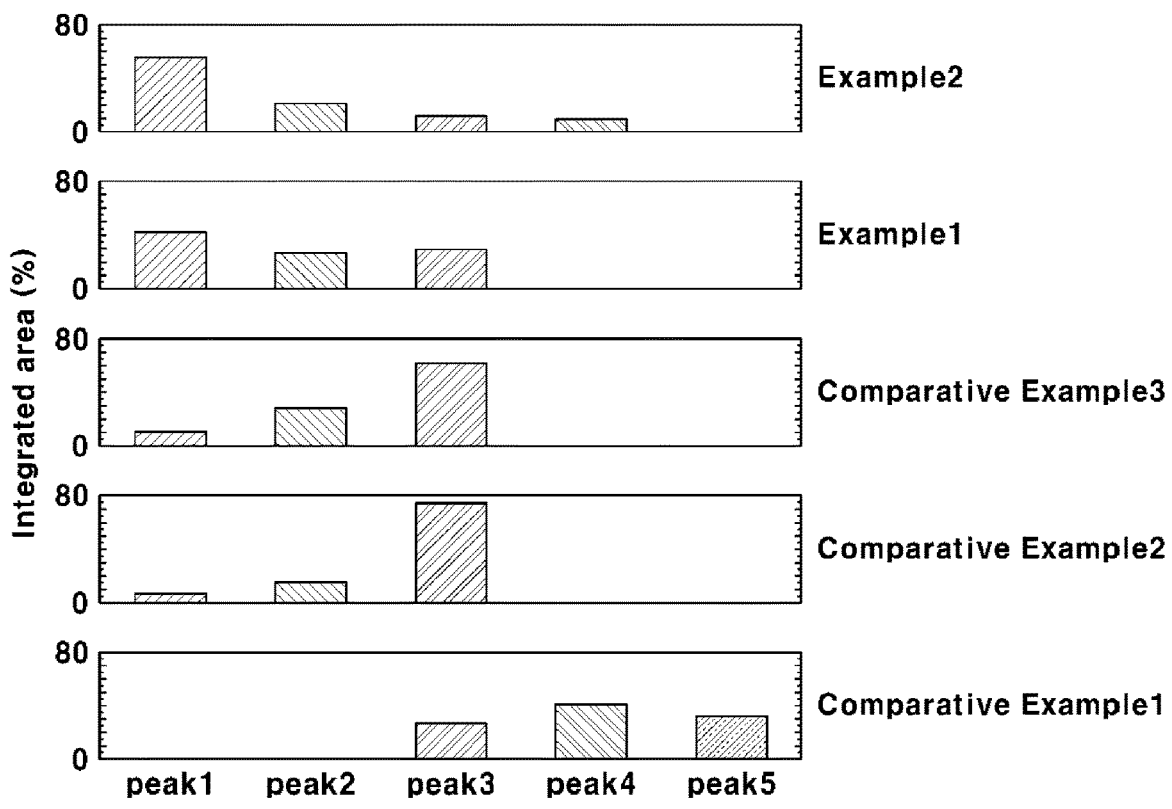
FIG. 7B

FIG. 11
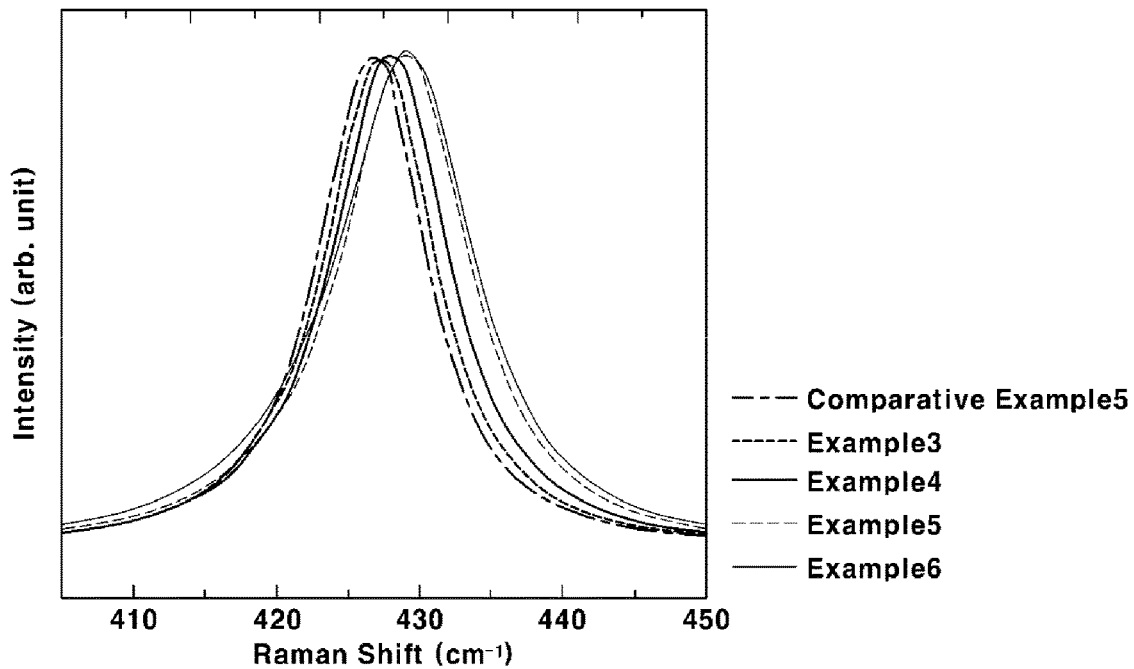
FIG. 11A
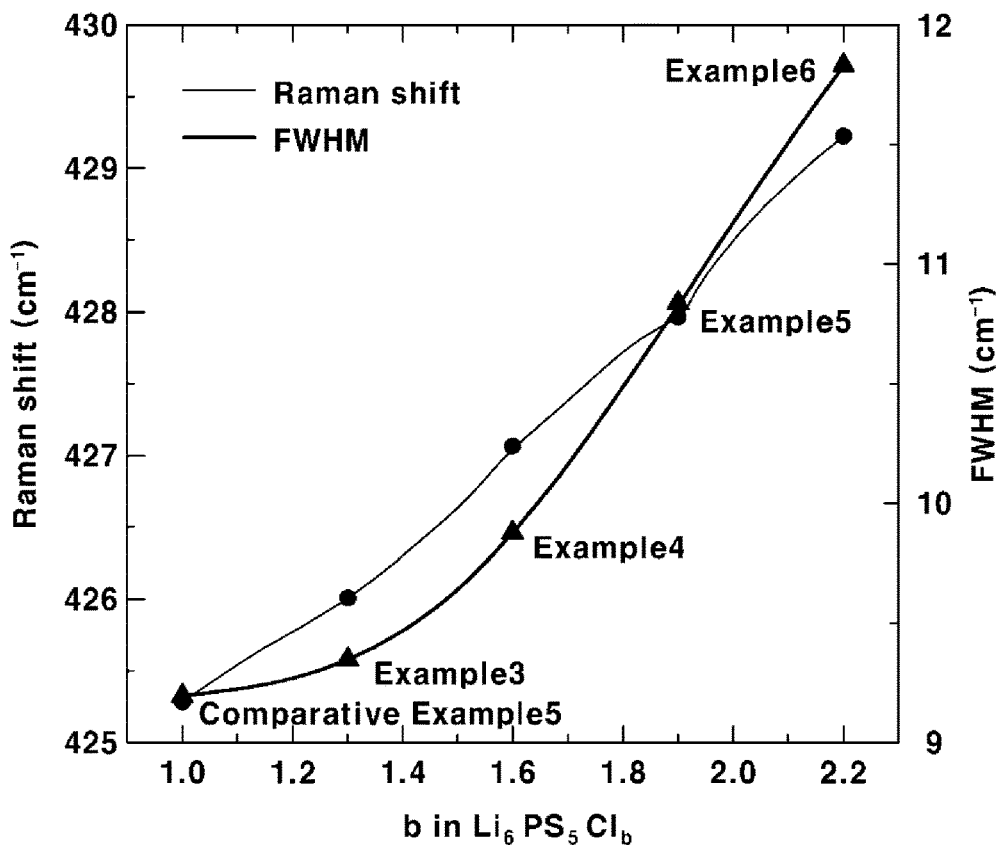
FIG. 11B

FIG. 12
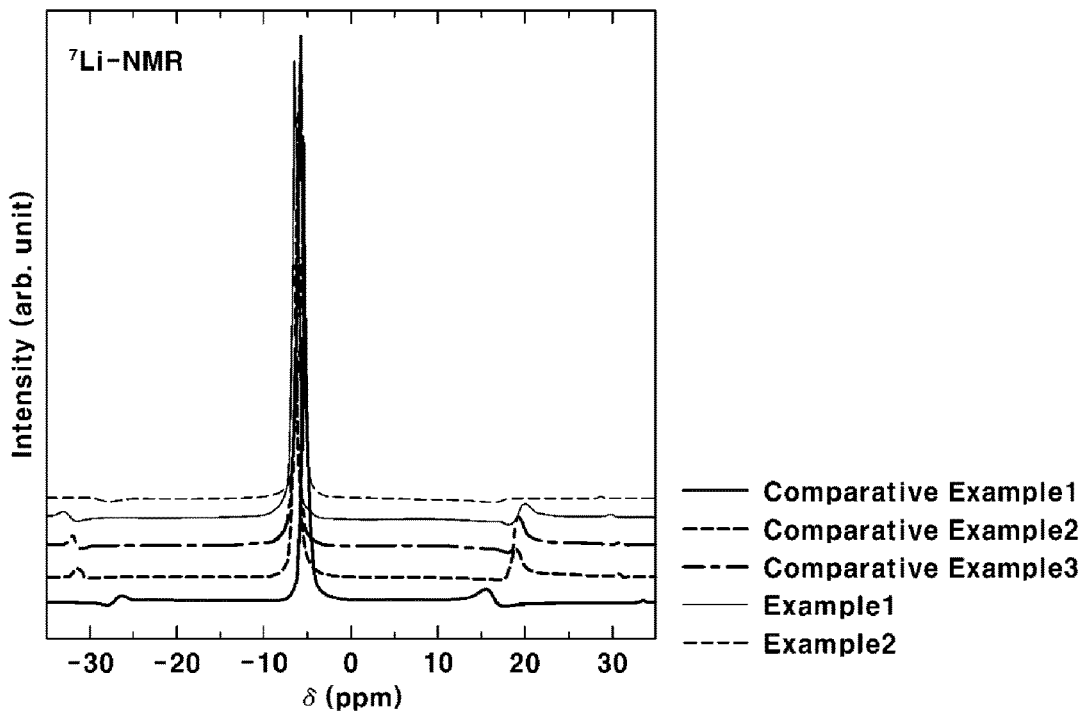
FIG. 12A
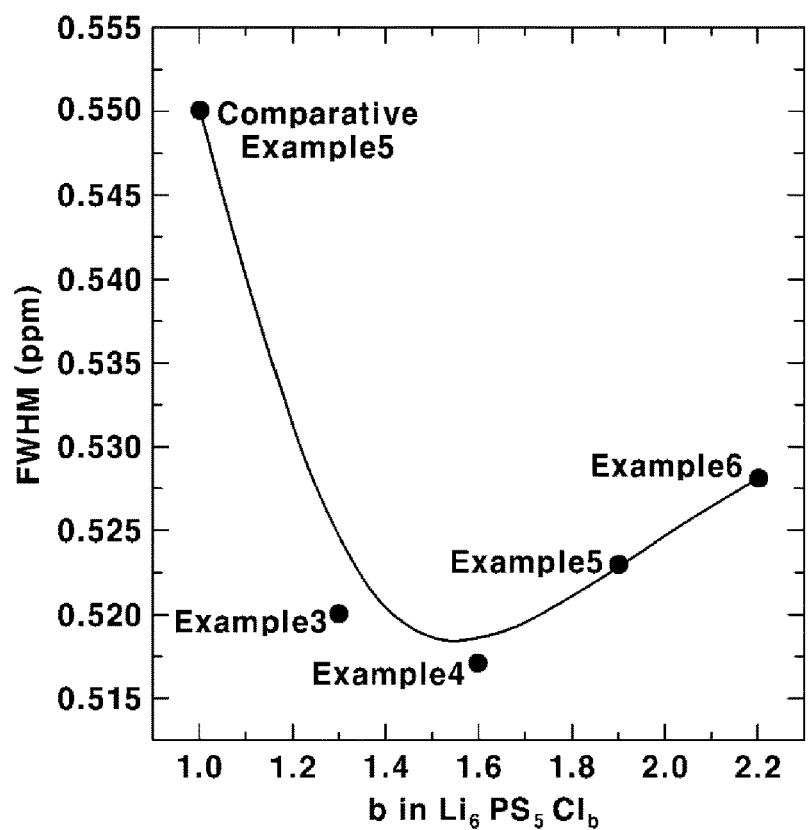
FIG. 12B

FIG. 13
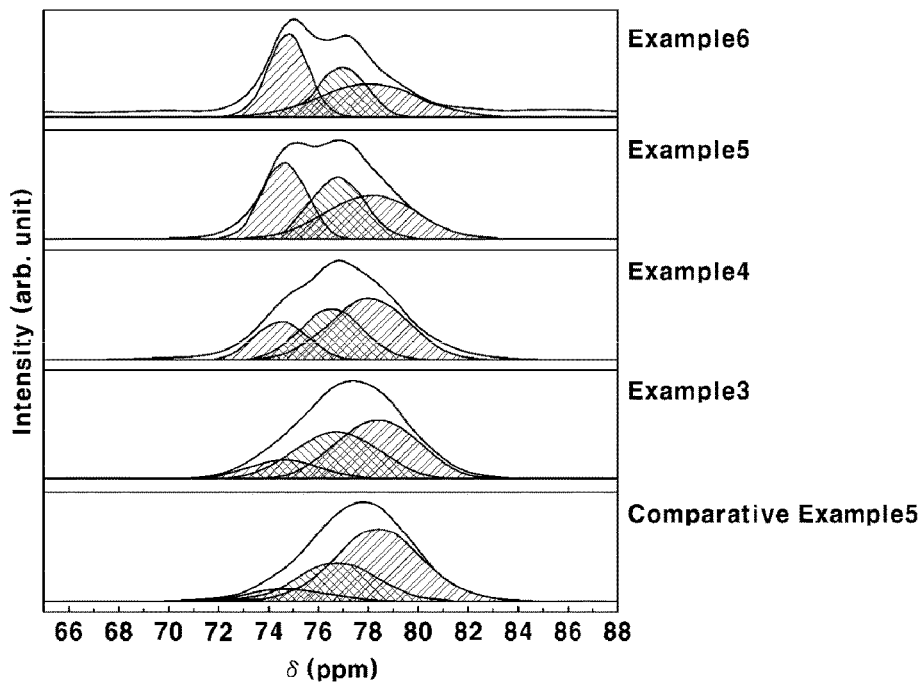
FIG. 13A
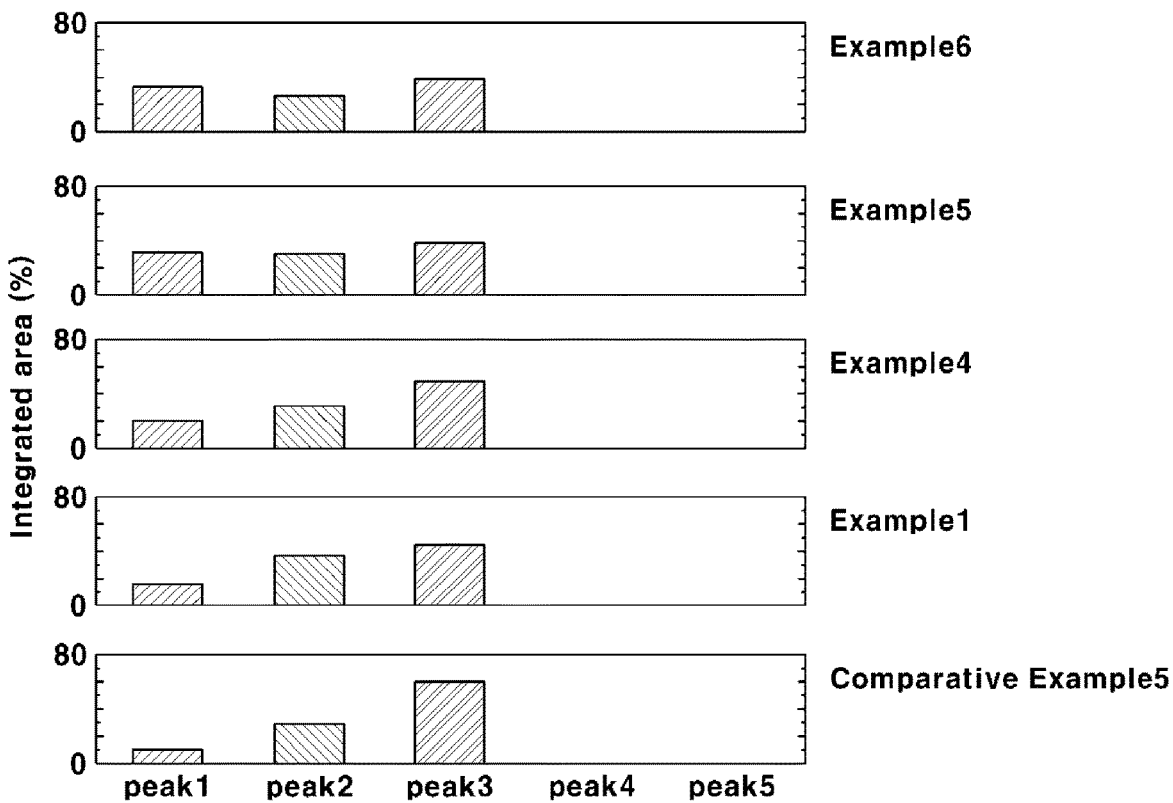
FIG.13B

LITHIUM ION CONDUCTIVE SULFIDE-BASED SOLID ELECTROLYTE WITH CONTROLLED HALOGEN ELEMENTS CONTENT AND METHOD OF PREPARING THE SAME

CROSS-REFERENCE TO RELATED APPLICATION

This application claims, under 35 U.S.C. § 119(a), the benefit of priority to Korean Patent Application No. 10-2019-0053552, filed on May 8, 2019, the entire contents of which are incorporated herein by reference.

BACKGROUND

(a) Technical Field

The present invention relates to a sulfide-based solid electrolyte imparted with improved lithium ion conductivity by controlling a halogen content and a method of preparing the same.

(b) Background Art

Secondary battery technologies used for electronic devices such as cellular phones and notebooks as well as vehicles such as hybrid vehicles and electric vehicles require electrochemical devices with better stability and higher energy density.

Currently, conventional secondary battery technologies are limited in the extent to which stability and energy density can be improved because most of them have cells based on an organic solvent (organic liquid electrolyte).

On the other hand, all-solid-state batteries using inorganic solid electrolytes have recently attracted a great deal of attention because they are based on technologies excluding the use of an organic solvent and thus enable cells to be produced in a safer and simpler manner.

However, the most representative example of a solid electrolyte for all-solid-state batteries that has been developed to date is a material based on lithium-phosphorus-sulfur (Li—P—S, LPS), on which active research must be conducted prior to mass-production due to drawbacks such as low room-temperature lithium ion conductivity, instability of crystal phases, poor atmospheric stability, process restrictions and narrow ranges of high-conductive phase composition ratios.

U.S. Pat. No. 9,899,701 B2 reports $Li_6PS_5Cl$, which is a lithium-ion-conducting material with an argyrodite-type crystal structure. The crystal phase of $Li_6PS_5Cl$ is composed of lithium (Li), phosphorus (P), sulfur (S) and chlorine (Cl) and is stable because it is produced at a relatively high temperature. Although $Li_6PS_5Cl$ has a higher room-temperature lithium ion conductivity of about 2 mS/cm than conventional materials, it should secure a high lithium ion conductivity of 5 mS/cm or more for application to next-generation technologies. However, this issue remains unsolved.

PRIOR ART

Patent Document

U.S. Pat. No. 9,899,701 B2

The above information disclosed in this Background section is provided only for enhancement of understanding of the Background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

It is an object of the present invention to provide a novel composition of sulfide-based solid electrolyte having high lithium ion conductivity and a method for preparing the same.

The objects of the present invention are not limited to that described above. The objects of the present invention will be clearly understood from the following description and can be implemented by the means defined in the claims and combinations thereof.

In one aspect, the present invention provides a sulfide-based solid electrolyte containing a lithium element (Li), a phosphorus element (P), a sulfur element (S) and a halogen element (X), and including a crystal phase having an argyrodite crystal structure, wherein a molar ratio (X/P) of the halogen element (X) to the phosphorus element (P) is higher than 1.

The sulfide-based solid electrolyte may include a compound represented by the following Formula 1:

$$Li_{7-a}PS_{6-a}X_a \quad \text{[Formula 1]}$$

wherein X is a halogen element selected from the group consisting of chlorine (Cl), bromine (Br), iodine (I) and a combination thereof, and a satisfies 1<a<2.5.

The sulfide-based solid electrolyte may have major peaks at 2θ=26°±1.00°, 2θ=30°±1.00°, and 2θ=32°±1.00° when measuring X-ray diffraction patterns using CuKα rays, and a 2θ value of each peak may increase by 0.5° or less as a increases.

As a increases, a full width at half maximum (FWHM) of a peak of $PS_4^{3-}$ of the sulfide-based solid electrolyte may increase and the full width at half maximum may be 11.0 $cm^{-1}$ to 12.5 $cm^{-1}$.

The sulfide-based solid electrolyte may have a wave number of the peak of $PS_4^{3-}$, of 429 $cm^{-1}$ to 430 $cm^{-1}$.

In a $^7Li$-NMR spectrum of the sulfide-based solid electrolyte, a full width at half maximum of a main peak may decrease as a increases and the full width at half maximum may be within a range of 0.4 ppm to 0.5 ppm.

Three main peaks may be found in a $^{31}P$-NMR spectrum of the sulfide-based solid electrolyte and area ratios of the three main peaks may be 42%<Peak 1<60%, 21%<Peak 2<28%, and 12%<Peak 3<31%, respectively.

The sulfide-based solid electrolyte may include a compound represented by the following Formula 2:

$$Li_6PS_5X_b \quad \text{[Formula 2]}$$

wherein X is a halogen element selected from the group consisting of chlorine (Cl), bromine (Br), iodine (I) and a combination thereof, and b satisfies 1<b<2.5.

The sulfide-based solid electrolyte may have major peaks at 2θ=26°±1.00°, 2θ=30°±1.00°, and 2θ=32°±1.00° when measuring X-ray diffraction patterns using CuKα rays, and a 2θ value of each peak may increase by 0.2° or less as b increases.

The sulfide-based solid electrolyte may have major peaks at 2θ=26°±1.00°, 2θ=30°±1.00°, and 2θ=32°±1.00° when measuring X-ray diffraction patterns using CuKα rays, as b increases, a diffraction intensity ratio $[I_{(222)}/I_{(311)}]$ may decrease, wherein $I_{(311)}$ represents a diffraction intensity of the peak at $2\theta=30°\pm1.00°$ and $I_{(222)}$ represents a diffraction intensity of the peak at $2\theta=32°\pm1.00°$, and the diffraction intensity ratio $[I_{(222)}/I_{(311)}]$ may be 68% to 78%.

As b increases, a full width at half maximum (FWHM) of a peak of $PS_4^{3-}$ obtained by Raman spectroscopy of the sulfide-based solid electrolyte may increase and the full width at half maximum may be 9.3 cm$^{-1}$ to 12 cm$^{-1}$.

The sulfide-based solid electrolyte may have a wave number of the peak of $PS_4^{3-}$, of 426 cm$^{-1}$ to 429.5 cm$^{-1}$.

In a $^7$Li-NMR spectrum of the sulfide-based solid electrolyte, a full width at half maximum of a main peak may be within a range of 0.515 ppm to 0.530 ppm.

Three main peaks may be found in a $^{31}$P-NMR spectrum of the sulfide-based solid electrolyte and area ratios of the three main peaks may be 15%<Peak 1<35%, 25%<Peak 2<38% and 38%<Peak 3<50%, respectively.

In another aspect, the present invention provides a method for preparing a sulfide-based solid electrolyte including preparing a mixture containing lithium sulfide ($Li_2S$), diphosphorus pentasulfide ($P_2S_5$) and lithium halide (LiX), pulverizing the mixture, and heat-treating the pulverized mixture.

The mixture may contain 44 mol % to 50 mol % of lithium sulfide, 9 mol % to 15 mol % of phosphorus pentasulfide, and 38 mol % to 43 mol % of lithium halide.

The mixture may further contain elemental sulfur (S), wherein the mixture contains 35 mol % to 55 mol % of lithium sulfide, 9 mol % to 15 mol % of phosphorus pentasulfide, 3 mol % to 15 mol % of elemental sulfur and 30 mol % to 50 mol % of lithium halide.

The mixture may be pulverized by applying a G-force of 40 G or more to the mixture.

The pulverized mixture may be heat-treated at a temperature of 300° C. to 600° C. for 10 seconds to 10 hours.

Other aspects and preferred embodiments of the invention are discussed infra.

BRIEF DESCRIPTION OF THE DRAWINGS

The above and other features of the present invention will now be described in detail with reference to certain exemplary embodiments thereof, illustrated in the accompanying drawings, which are given herein below by way of illustration only, and thus are not limitative of the present invention, and wherein:

FIG. 5 shows the result of Raman spectroscopy in Experimental Example 3, more particularly, FIG. 5A shows a Raman spectrum of the sulfide-based solid electrolyte and FIG. 5B shows a Raman shift and full width at half maximum (FWHM) of the sulfide-based solid electrolyte;

FIG. 6 shows the result of $^7$Li-NMR analysis in Experimental Example 4, more particularly, FIG. 6A is a $^7$Li-NMR graph of the sulfide-based solid electrolyte and FIG. 6B shows a full width at half maximum of the sulfide-based solid electrolyte;

FIG. 7 shows the result of $^{31}$P-NMR analysis in Experimental Example 4, more particularly, FIG. 7A is a $^{31}$P-NMR graph of the sulfide-based solid electrolyte and FIG. 7B is a bar graph showing the result of quantitative analysis of the ratio of each peak of FIG. 7A;

FIG. 11 shows the result of Raman spectroscopy in Experimental Example 7, more particularly, FIG. 11A shows a Raman spectrum of the sulfide-based solid electrolyte and FIG. 11B shows a Raman shift and full width at half maximum (FWHM) of the sulfide-based solid electrolyte;

FIG. 12 shows the result of $^7$Li-NMR analysis in Experimental Example 8, more particularly, FIG. 12A is a $^7$Li-NMR graph of the sulfide-based solid electrolyte and FIG. 12B shows a full width at half maximum of the sulfide-based solid electrolyte; and FIG. 13 shows the result of $^{31}$P-NMR analysis in Experimental Example 8, more particularly, FIG. 13A is a $^{31}$P-NMR graph of the sulfide-based solid electrolyte and FIG. 13B is a bar graph showing the result of quantitative analysis of the ratio of each peak of FIG. 13A.

DETAILED DESCRIPTION

Figure 1:
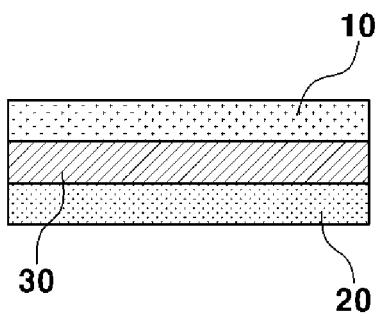
FIG. 1 is a sectional view schematically showing an all-solid-state battery according to the present invention.

The objects described above, and other objects, features and advantages of the present invention, will be clearly understood from the following preferred embodiments with reference to the attached drawings. However, the present invention is not limited to the embodiments and may be embodied in different forms. The embodiments are suggested only to offer a thorough and complete understanding of the disclosed context and to sufficiently inform those skilled in the art of the technical concept of the present invention.

Like numbers refer to like elements throughout the description of the figures. In the drawings, the sizes of structures are exaggerated for clarity. It will be understood that, although the terms "first", "second", etc. may be used herein to describe various elements, these elements should not be construed to be limited by these terms, which are used only to distinguish one element from another. For example, within the scope defined by the present invention, a "first" element may be referred to as a "second" element, and similarly, a "second" element may be referred to as a "first" element. Singular forms are intended to include plural forms as well, unless the context clearly indicates otherwise.

It will be further understood that the terms "comprises" and/or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numerical ranges are disclosed in the description, these ranges are continuous and include all numbers from the minimum to the maximum including the maximum within each range unless otherwise defined. Furthermore, when the range refers to an integer, it includes all integers from the minimum to the maximum including the maximum within the range, unless otherwise defined.

FIG. 1 is a sectional view schematically showing an all-solid-state battery according to the present invention. The all-solid-state battery includes an anode 10, a cathode 20, and a solid electrolyte layer 30 interposed between the anode 10 and the cathode 20.

The lithium-ion-conducting sulfide-based solid electrolyte having a novel composition with a controlled halogen content is included in at least one of the anode 10, the cathode 20 and the solid electrolyte layer 30.

The sulfide-based solid electrolyte contains a lithium element (Li), a phosphorus element (P), a sulfur element (S) and a halogen element (X), and includes a crystal phase of an argyrodite crystal structure, wherein a molar ratio (X/P) of the halogen element (X) to the phosphorus element (P) is higher than 1.

As used herein, when the sulfide-based solid electrolyte is referred to as "comprising" respective elements, the respective elements are chemically bonded to each other to form a specific form of crystal phase. That is, this should be interpreted to be distinguished from the case in which compounds containing each element are physically mixed.

Specifically, the sulfide-based solid electrolyte according to an embodiment of the present invention may include a compound represented by the following Formula 1:

[Formula 1]

wherein X is a halogen element selected from the group consisting of chlorine (Cl), bromine (Br), iodine (I) and a combination thereof, and a satisfies 1<a<2.5.

The sulfide-based solid electrolyte may further include an element selected from the group consisting of boron (B), carbon (C), nitrogen (N), aluminum (Al), silicon (Si), vanadium (V), manganese (Mn), iron (Fe), cobalt (Co), nickel (Ni), copper (Cu), zinc (Zn), gallium (Ga), germanium (Ge), arsenic (As), silver (Ag), cadmium (Cd), tin (Sn), antimony (Sb), tellurium (Te), lead (Pb), bismuth (Bi) and a combination thereof. The element may be substituted with a phosphorus (P) or sulfur (S) element when included in the sulfide-based solid electrolyte.

Figure 2:
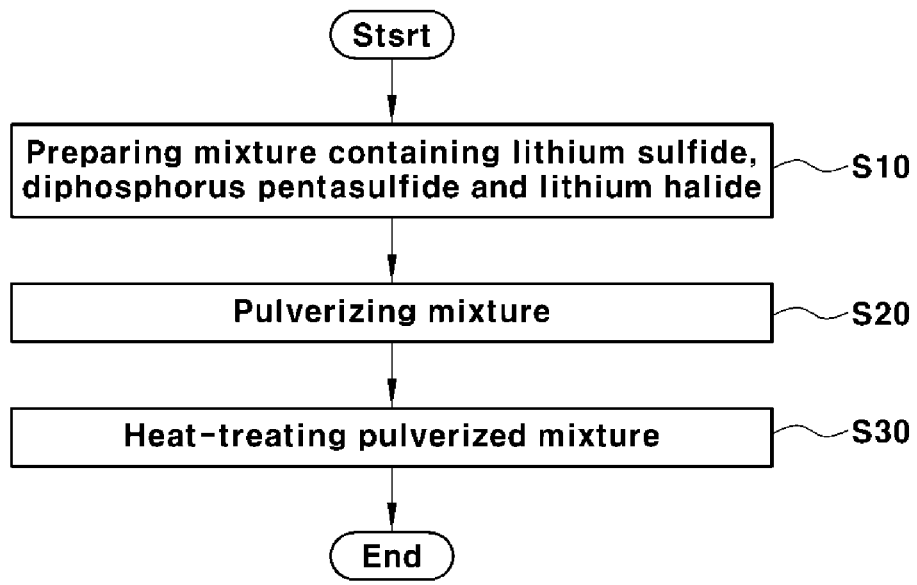
FIG. 2 is a flowchart illustrating a method for preparing the sulfide-based solid electrolyte according to an embodiment of the present invention.

FIG. 2 is a flowchart illustrating a method for preparing the sulfide-based solid electrolyte according to an embodiment of the present invention. Referring to FIG. 2, the method for preparing the sulfide-based solid electrolyte includes preparing a mixture containing lithium sulfide ($Li_2S$), diphosphorus pentasulfide ($P_2S_5$) and lithium halide (LiX) (S10), pulverizing the mixture (S20), and heat-treating the pulverized mixture (S30).

In order to obtain the compound represented by Formula 1, the mixture may be prepared by appropriately controlling the content of each ingredient of the mixture (S10). For example, the mixture may include 44 mol % to 50 mol % of lithium sulfide, 9 mol % to 15 mol % of phosphorus pentasulfide, and 38 mol % to 43 mol % of lithium halide.

In addition, the present invention is characterized in that the pulverizing is carried out by applying a G-force of 40 G or more to the mixture. The upper limit of G-force applied to the mixture is not particularly limited and can be suitably controlled by controlling the conditions of devices, apparatuses and the like. For example, a G-force of 70 G or less, 60 G or less, or 50 G or less may be applied thereto.

The pulverizing method is not particularly limited, but may be conducted using a ball mill, such as, an electric ball mill, a vibration ball mill or a planetary ball mill, or a vibration mixer mill, an SPEX mill or the like. Preferably, a planetary ball mill is used. Specifically, when raw materials and beads are charged in a container and a planetary ball mill is then operated, the beads in the container pulverize the raw materials using frictional force while rotating along the wall of the container. At this time, the rotation rate is increased so as to apply an inertial G-force of 40 G or more to the beads. As a result, the G-force of 40 G or more can be applied to the raw materials as well.

Conventionally, the mixture was made glassy by pulverizing the mixture through low-inertia milling using application of a G-force of less than 38 G. Then, the pulverized mixture was heat-treated at a temperature of 500° C. to 600° C., typically for 4 hours to 8 hours, and in long-period cases for 2 to 3 days, for crystallization. On the other hand, the present invention adopts pulverization of the mixture through high-inertia milling using applying a G-force of 40 G or more thereto, as described above. As a result, the pulverized mixture is converted into a glass-ceramic material having a relatively high degree of crystallinity, unlike the conventional case. Therefore, the present invention enables the pulverized mixture to be crystallized through heat-treatment for about 2 hours, which is significantly shorter than the conventional case.

The heat-treatment (S30) is a step of crystallizing the pulverized mixture. The heat-treatment conditions are not particularly limited, but may be performed at a temperature higher than the crystallization temperature of the pulverized mixture. For example, the heat-treatment (S30) may be carried out by heat-treating the pulverized mixture at a temperature of 300° C. to 600° C. for 10 seconds to 10 hours.

The heat-treatment (S30) increases the crystallinity of the pulverized mixture and thereby greatly improves the lithium ion conductivity.

Hereinafter, one embodiment of the present invention will be described in more detail with reference to examples. However, the following examples are provided only for better understanding of the present invention and should not be construed as limiting the scope of the present invention.

EXAMPLES 1 AND 2 AND COMPARATIVE EXAMPLES 1 TO 3

A mixture containing lithium sulfide ($Li_2S$), diphosphorus pentasulfide ($P_2S_5$), and lithium chloride (LiCl) in the mol % contents shown in the following Table 1 was prepared.

The mixture was charged in a pulverizing container made of zirconia ($ZrO_2$) equipped with a gas-sealing device. The pulverizing media herein used were beads made of zirconia (diameter of about 3 mm). At this time, the beads were charged in an amount equal to 20 times the amount of the mixture. A G-force of about 49 G was applied to the mixture by planetary milling. Specifically, the mixture was pulverized for 18 cycles, each cycle including 30-minutes milling while applying a G-force of about 49 G to the mixture and 30-minutes standing.

The pulverized mixture was heat-treated under an argon gas atmosphere at about 500° C. for about 2 hours to obtain a sulfide-based solid electrolyte.

TABLE 1

| Item | Composition of Mixture [mol %] | | | Empirical formula | a in Formula 1 |
|---|---|---|---|---|---|
| | $Li_2S$ | $P_2S_5$ | LiCl | | |
| Example 1 | 50 | 12.5 | 37.5 | $Li_{5.5}PS_{4.5}Cl_{1.5}$ | 1.5 |
| Example 2 | 43.75 | 12.5 | 43.75 | $Li_{5.25}PS_{4.25}Cl_{1.75}$ | 1.75 |
| Comparative Example 1 | 87.5 | 12.5 | 0 | $Li_7PS_6$ | 0 |
| Comparative Example 2 | 75 | 12.5 | 12.5 | $Li_{6.5}PS_{5.5}Cl_{0.5}$ | 0.5 |
| Comparative Example 3 | 62.5 | 12.5 | 25 | $Li_6PS_5Cl$ | 1 |

COMPARATIVE EXAMPLE 4

A sulfide-based solid electrolyte was prepared in the same manner as in Comparative Example 3, except that the mixture was pulverized while a G-force of about 38 G was applied thereto.

EXPERIMENTAL EXAMPLE 1

Measurement of Lithium Ion Conductivity

Figure 3:
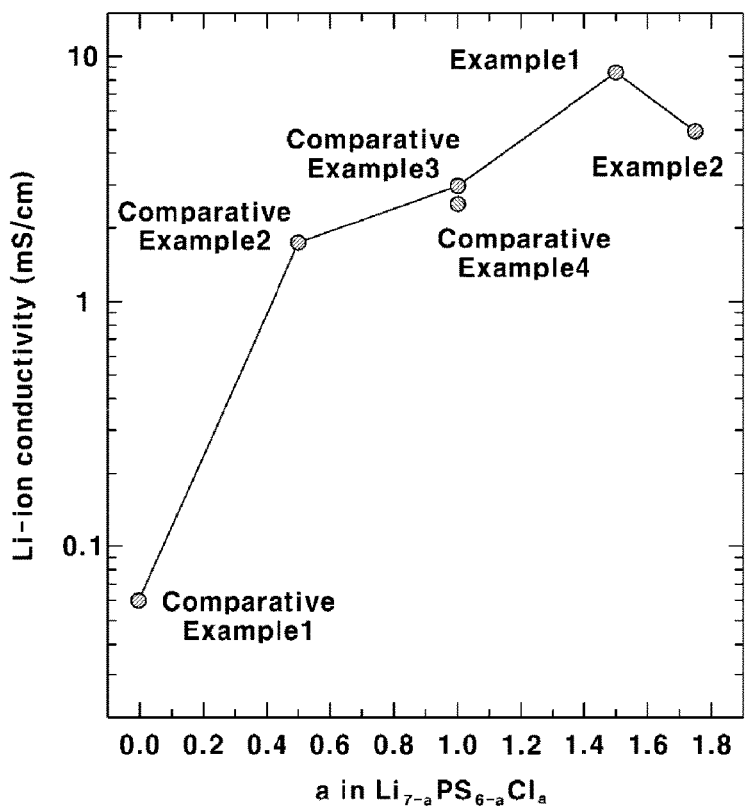
FIG. 3 shows the result of measurement of lithium ion conductivity in Experimental Example 1.

Alternating-current impedance analysis was conducted at room temperature in order to measure the lithium ion conductivity of the sulfide-based solid electrolytes according to Examples 1 and 2 and Comparative Examples 1 to 4. Pellets were produced from 0.15 g of a powder and heat-treated at 500° C. for 2 hours. The pellets were charged into a jig for measuring lithium ion conductivity, placed in a thermo-hygrostat and then maintained at room temperature for 40 minutes. Then, an AC voltage of 100 mV was applied thereto and a frequency sweep was performed from 1,000 Hz to 1 MHz to determine the impedance of the measurement sample. The results are shown in FIG. 3 and Table 2.

TABLE 2

| Item | Empirical formula | a in Formula 1 | Lithium ion conductivity [mS/cm] |
|---|---|---|---|
| Example 1 | $Li_{5.5}PS_{4.5}Cl_{1.5}$ | 1.5 | 8.47 |
| Example 2 | $Li_{5.25}PS_{4.25}Cl_{1.75}$ | 1.75 | 4.92 |
| Comparative Example 1 | $Li_7PS_6$ | 0 | 0.06 |
| Comparative Example 2 | $Li_{6.5}PS_{5.5}Cl_{0.5}$ | 0.5 | 1.71 |
| Comparative Example 3 | $Li_6PS_5Cl$ | 1 | 2.95 |
| Comparative Example 4 | $Li_6PS_5Cl$ | 1 | 2.5 |

It can be seen from Table 2 that Examples 1 and 2 show significantly higher lithium ion conductivity than Comparative Examples 1 to 4. In particular, the sulfide-based solid electrolyte according to Example 1 (when a is 1.5 in Formula 1) showed a very high lithium ion conductivity of about 8.47 mS/cm at room temperature.

EXPERIMENTAL EXAMPLE 2

X-Ray Diffraction (XRD) Analysis

Figure 4:
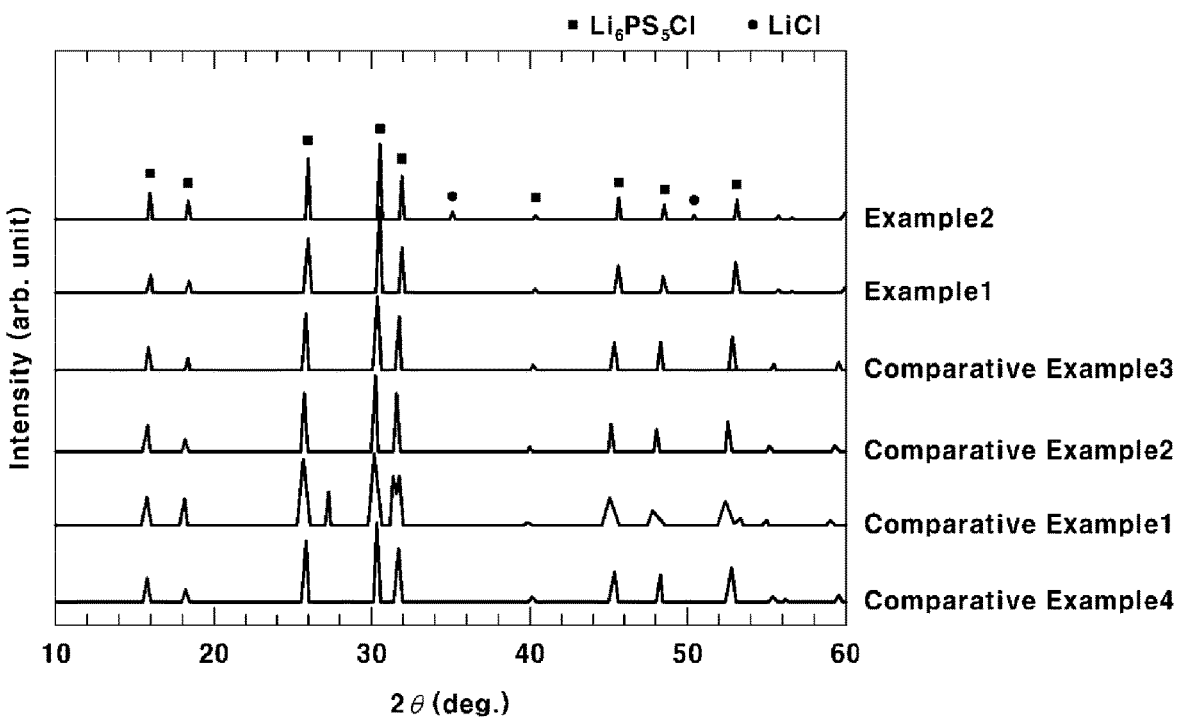
FIG. 4 shows the result of X-ray diffraction (XRD) analysis in Experimental Example 2.

X-ray diffraction (XRD) analysis was conducted in order to analyze the crystal structures of the sulfide-based solid electrolytes according to Examples 1 and 2 and Comparative Examples 1 to 4. Each sample was loaded on an air-sealed holder for XRD applications and XRD was measured in a range of $10°≤2θ≤60°$ at a scanning rate of 2°/min. The results are shown in FIG. 4.

It can be seen from this that the sulfide-based solid electrolyte according to Example 2 exhibited the LiCl peak due to inclusion of an excess of halogen elements.

In addition, the sulfide-based solid electrolytes according to Examples 1 and 2 had major peaks at $2θ=26°±1.00°$, $2θ=30°±1.00°$, and $2θ=32°±1.00°$ when measuring X-ray diffraction patterns using CuKα rays. It can be seen that the 2θ value of each peak increases when a in Formula 1, indicating the mole number of the halogen element, increases. The increment in 2θ value was measured to be about 0.5° or less.

EXPERIMENTAL EXAMPLE 3

Raman Spectroscopy

Raman spectroscopy was conducted in order to analyze the structural properties of the sulfide-based solid electrolytes according to Examples 1 and 2 and Comparative Examples 1 to 3. Each sample was loaded on an air-sealed holder, the sample was irradiated with an argon (Ar)-ion laser with a wavelength of 514 nm and the molecular vibration spectrum of the sample was measured for 60 seconds. The results are shown in FIGS. 5A and 5B. FIG. 5A shows a Raman spectrum of each sulfide-based solid electrolyte and FIG. 5B shows a Raman shift and a full width at half maximum (FWHM) of each sulfide-based solid electrolyte.

Referring to FIG. 5A, it can be seen that the peaks of Examples 1 and 2 have $PS_4^{3-}$ ion cluster positions distinguished from those of Comparative Examples 1 to 3. Specifically, Examples 1 and 2 have a wave number of the peak of $PS_4^{3-}$, of 429 $cm^{-1}$ to 430 $cm^{-1}$.

It can be seen from the results of Examples 1 and 2 and Comparative Examples 1 to 3 of FIG. 5B that, as the value of a in Formula 1 increases, the full width at half maximum (FWHM) of the peak of $PS_4^{3-}$ increases, and the full width at half maximum is 11.0 $cm^{-1}$ to 12.5 $cm^{-1}$ in Examples 1 and 2.

EXPERIMENTAL EXAMPLE 4

NMR Analysis

NMR analysis was conducted in order to evaluate chemical changes to sulfide-based solid electrolytes according to Examples 1 and 2 and Comparative Examples 1 to 3. Each sample was placed in an air-sealed NMR container and measured at a spinning rate of 6,000 Hz using a $^7Li$ probe and a $^{31}P$ probe. Data were generated from the received information through Fourier transform.

FIG. 6A is a $^7$Li-NMR graph of each sulfide-based solid electrolyte and FIG. 6B shows a full width at half maximum of each sulfide-based solid electrolyte.

As can be seen from the results of Examples 1 and 2 and Comparative Examples 1 to 3 shown in FIGS. 6A and 6B, the full width at half maximum of the main peak decreases as the value of a in Formula 1 increases. Here, the main peak means the peak at which the intensity is the greatest. In particular, it can be seen that the main peaks of Examples 1 and 2 are positioned in a range of 0.4 ppm to 0.5 ppm.

In addition, the position of the main peak was shifted toward a lower ppm and the shift was found to be within a region from −6.26 ppm to −5.39 ppm.

In addition, peak splitting was observed based on the main peak, and these peaks were also shifted, specifically, peaks added at a low ppm were shifted toward a lower ppm and peaks added at a high ppm were shifted toward a higher ppm. At this time, the shift of the right peak ranged from 15 ppm to 20 ppm and the shift of the left peak ranged from −33 ppm to −25 ppm.

FIG. 7A is a $^{31}$P-NMR graph of each sulfide-based solid electrolyte and FIG. 7B is a bar graph showing the result of quantitative analysis of the ratio of each peak of FIG. 7A.

As can be seen from FIGS. 7A and 7B, three to four main peaks are found in Examples 1 and 2. The main peak found at about 75 ppm is designated as "Peak 1", the main peak found at about 77 ppm is designated as "Peak 2", the main peak found at about 79 ppm is designated as "Peak 3", the main peak found at about 80 ppm is designated as "Peak 4", and the main peak found at about 82 ppm is designated as "Peak 5".

The following Table 3 shows the values obtained by quantitative analysis of the ratio of each peak found in each sulfide-based solid electrolyte.

TABLE 3

| Item | a in Formula 1 | $^{31}$P-NMR peak area ratio [%] | | | | |
|---|---|---|---|---|---|---|
| | | Peak1 | Peak2 | Peak3 | Peak4 | Peak5 |
| Example 1 | 1.5 | 42.78 | 26.74 | 30.48 | 0 | 0 |
| Example 2 | 1.75 | 55.83 | 21.97 | 12.59 | 9.61 | 0 |
| Comparative Example 1 | 0 | 0 | 0 | 26.97 | 40.87 | 32.16 |
| Comparative Example 2 | 0.5 | 7.06 | 15.95 | 76.99 | 0 | 0 |
| Comparative Example 3 | 1 | 10.56 | 29.44 | 60 | 0 | 0 |

As can be seen from this, in the sulfide-based solid electrolytes of Examples 1 and 2, the area ratios of three main peaks found in the $^{31}$P-NMR spectrum were 42%<Peak 1<60%, 21%<Peak 2<28%, and 12%<Peak 3<31%, respectively.

Hereinafter, the sulfide-based solid electrolyte according to another embodiment of the present invention will be described in detail.

The sulfide-based solid electrolyte according to another embodiment of the present invention may include a compound represented by the following Formula 2:

$$Li_6PS_5X_b \quad \text{[Formula 2]}$$

wherein X is a halogen element selected from the group consisting of chlorine (Cl), bromine (Br), iodine (I) and a combination thereof, and b satisfies 1<b<2.5.

Figure 8:
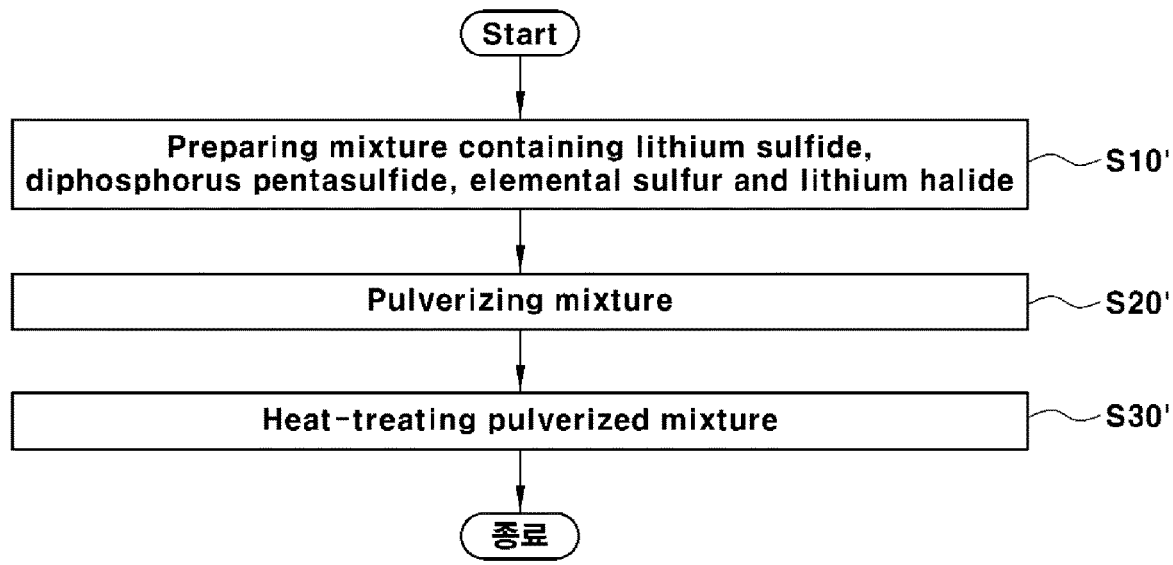
FIG. 8 is a flowchart illustrating a method for preparing the sulfide-based solid electrolyte according to another embodiment of the present invention.

FIG. 8 is a flowchart illustrating a method for preparing the sulfide-based solid electrolyte according to another embodiment of the present invention. Referring to FIG. 8, the method for preparing the sulfide-based solid electrolyte includes preparing a mixture containing lithium sulfide (Li$_2$S), diphosphorus pentasulfide (P$_2$S$_5$), elemental sulfur (S) and lithium halide (LiX) (S10'), pulverizing the mixture (S20') and heat-treating the pulverized mixture (S30').

The sulfide-based solid electrolyte has a molar ratio (X/P) of the halogen element (X) to the phosphorus element (P), of higher than 1. The halogen element (X) is contained in excess compared to conventional Li$_6$PS$_5$Cl. In order to realize the composition described above, the present invention is characterized in that elemental sulfur (S) is added in the step of preparing the mixture (S10). As used herein, the term "elemental substance" refers to a single element substance which includes one element and thus has the inherent chemical properties thereof.

In order to obtain the compound represented by Formula 1, the mixture may be prepared by appropriately controlling the content of each ingredient of the mixture (S10'). For example, the mixture may include 35 mol % to 55 mol % of lithium sulfide, 9 mol % to 15 mol % of phosphorus pentasulfide, 3 mol % to 15 mol % of elemental sulfur and 30 mol % to 50 mol % of lithium halide.

The pulverizing and heat-treating of the mixture are substantially the same as in one embodiment of the present invention described above and thus a detailed description thereof will be omitted below.

Hereinafter, another embodiment of the present invention will be described in more detail with reference to examples. However, the following examples are provided only for better understanding of the present invention and should not be construed as limiting the scope of the present invention.

EXAMPLES 3 TO 6 AND COMPARATIVE EXAMPLE 5

A mixture containing lithium sulfide (Li$_2$S), diphosphorus pentasulfide (P$_2$S$_5$) and lithium chloride (LiCl) in the mol % contents shown in the following Table 4 was prepared.

A sulfide-based solid electrolyte was prepared in the same manner as in Example 1 above.

TABLE 4

| | Composition of mixture [mol %] | | | | Empirical formula | b in Formula 2 |
|---|---|---|---|---|---|---|
| Item | Li$_2$S | P$_2$S$_5$ | S | LiCl | | |
| Example 3 | 54.65 | 11.63 | 3.49 | 30.23 | Li$_6$PS$_5$Cl$_{1.3}$ | 1.3 |
| Example 4 | 47.83 | 10.87 | 6.52 | 34.78 | Li$_6$PS$_5$Cl$_{1.6}$ | 1.6 |
| Example 5 | 41.84 | 10.2 | 9.18 | 38.78 | Li$_6$PS$_5$Cl$_{1.9}$ | 1.9 |
| Example 6 | 36.54 | 9.61 | 11.54 | 42.31 | Li$_6$PS$_5$Cl$_{2.2}$ | 2.2 |
| Comparative Example 5 | 62.5 | 12.5 | 0 | 25 | Li$_6$PS$_5$Cl | 1 |

EXPERIMENTAL EXAMPLE 5

Measurement of Lithium Ion Conductivity

Figure 9:
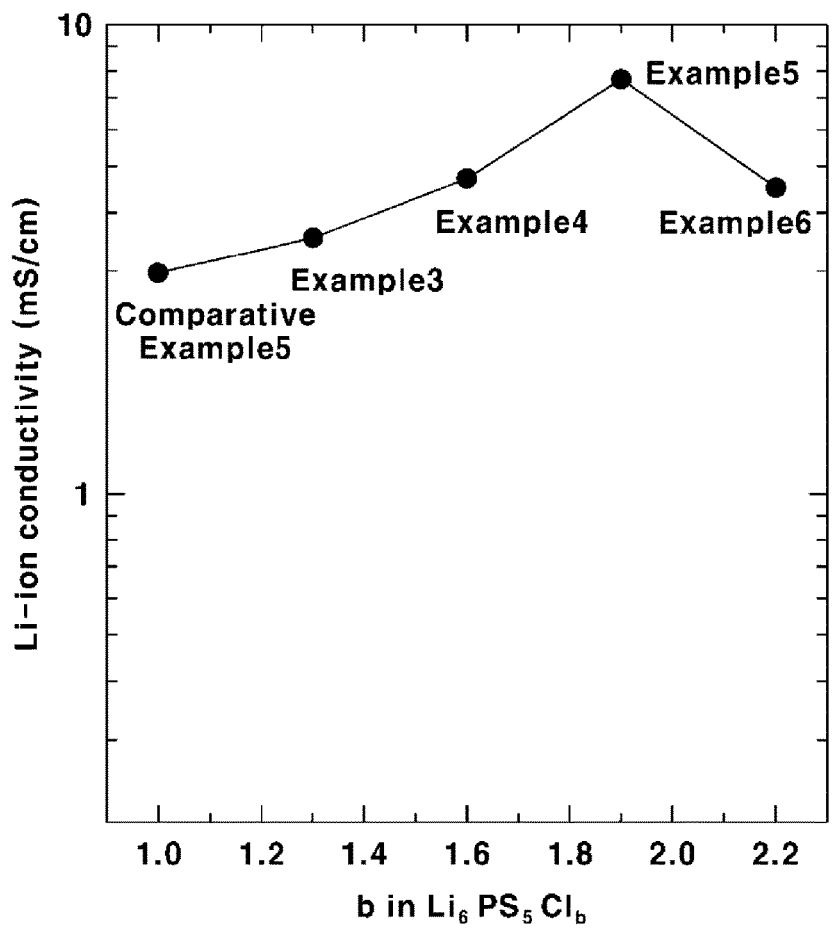
FIG. 9 shows the result of measurement of lithium ion conductivity in Experimental Example 5.

Alternating-current impedance analysis was conducted at room temperature in order to measure the lithium ion conductivity of sulfide-based solid electrolytes according to Examples 3 to 6 and Comparative Example 5. The measurement method was the same as in Experimental Example 1 and thus a description thereof is omitted. The results are shown in FIG. 9 and Table 5.

TABLE 5

| Item | Empirical formula | b in Formula 2 | Lithium ion conductivity [mS/cm] |
|---|---|---|---|
| Example 3 | $Li_6PS_5Cl_{1.3}$ | 1.3 | 3.5 |
| Example 4 | $Li_6PS_5Cl_{1.6}$ | 1.6 | 4.7 |
| Example 5 | $Li_6PS_5Cl_{1.9}$ | 1.9 | 7.66 |
| Example 6 | $Li_6PS_5Cl_{2.2}$ | 2.2 | 4.5 |
| Comparative Example 5 | $Li_6PS_5Cl$ | 1 | 2.95 |

It can be seen from Table 5 that Examples 3 to 6 show significantly higher lithium ion conductivity than Comparative Example 5. In particular, the sulfide-based solid electrolyte according to Example 5 (when b is 1.5 in Formula 2) showed a very high lithium ion conductivity of about 7.66 mS/cm at room temperature.

EXPERIMENTAL EXAMPLE 6

X-Ray Diffraction (XRD) Analysis

Figure 10A:
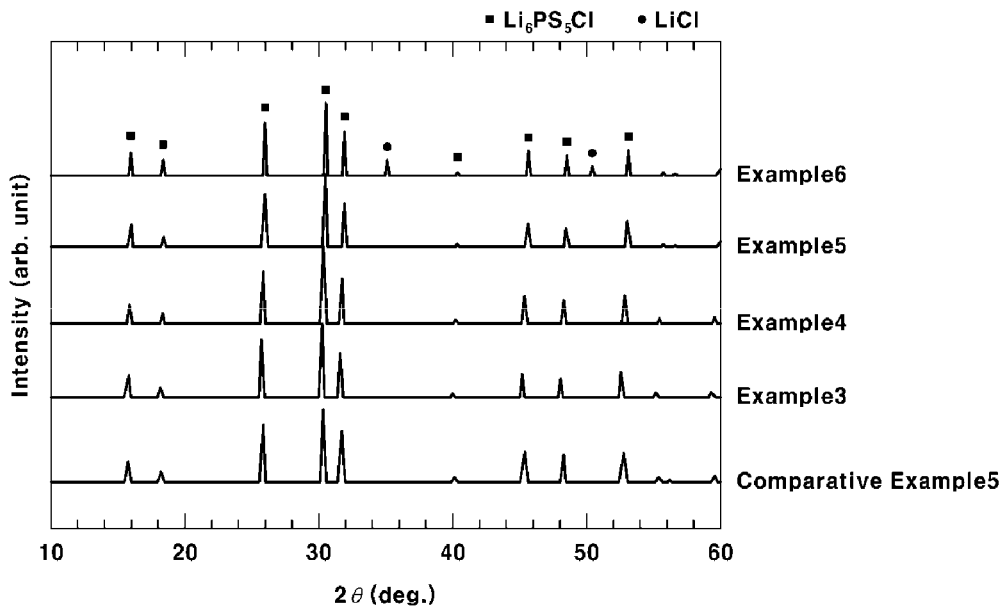
FIG. 10A shows the result of X-ray diffraction (XRD) analysis in Experimental Example 6 and FIG. 10B shows the result of measurement of a diffraction intensity ratio $[I_{(222)}/I_{(311)}]$ of a diffraction intensity $[I_{(222)}]$ of peak C to a diffraction intensity $[I_{(311)}]$ of peak B in the sulfide-based solid electrolytes of Examples 3 to 6 and Comparative Example 5.

X-ray diffraction (XRD) analysis was conducted in order to analyze the crystal structures of sulfide-based solid electrolytes according to Examples 3 to 6 and Comparative Example 5. The measurement method is the same as in Experimental Example 1 and thus a description thereof is omitted. The results are shown in FIG. 10A.

It can be seen from this that the sulfide-based solid electrolytes according to Examples 3 to 6 exhibited the LiCl peak due to inclusion of an excess of halogen elements.

In addition, the sulfide-based solid electrolytes according to Examples 3 to 6 had major peaks at 2θ=26°±1.00° (hereinafter, referred to as "Peak A"), 2θ=30°±1.00° (hereinafter, referred to as "Peak B"), and 2θ=32°±1.00° (hereinafter, referred to as "Peak C") when measuring X-ray diffraction patterns using CuKα rays. It can be seen that the 2θ values of peaks A to C increase as the mole number of the halogen element increases.

The 2θ values of peaks A to C in Examples 3 to 6 are given in the following Table 6.

TABLE 6

| Item | b in Formula 2 | Value at 2θ [°] Peak A | Peak B | Peak C |
|---|---|---|---|---|
| Comparative Example5 | 1 | 25.834 | 30.332 | 31.71 |
| Example3 | 1.3 | 25.858 | 30.358 | 31.725 |
| Example4 | 1.6 | 25.93 | 30.466 | 31.843 |
| Example5 | 1.9 | 25.922 | 30.444 | 31.812 |
| Example6 | 2.2 | 25.998 | 30.52 | 31.907 |

As can be seen from Table 6, the 2θ values of peaks A to C increase from Example 3 (a=1.3) to Example 6 (a=2.2), and the increment is 0.2° or less. That is, the sulfide-based solid electrolyte according to the present invention shows that the 2θ values of peaks A to C increase by 0.2° or less, because the halogen element is included in an excessive amount.

Figure 10B:
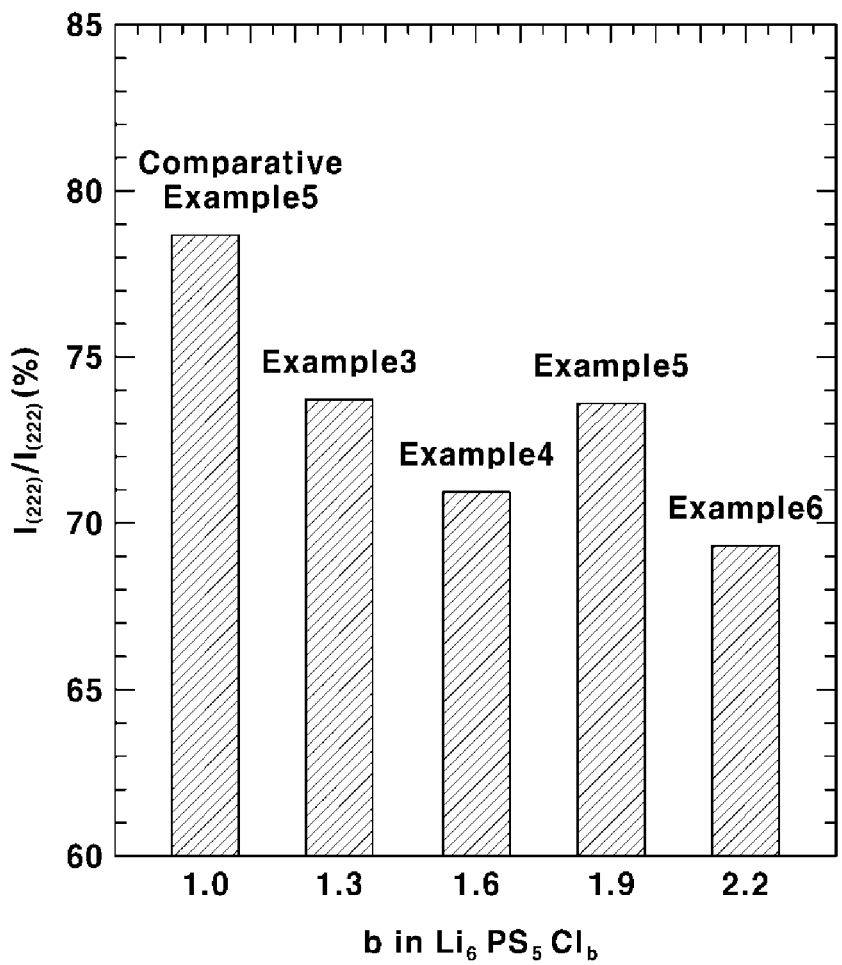

FIG. 10B shows the result of measurement of a diffraction intensity ratio $[I_{(222)}/I_{(311)}]$ of the diffraction intensity $[I_{(222)}]$ of peak C to the diffraction intensity $[I_{(311)}]$ of peak B in the sulfide-based solid electrolytes of Examples 3 to 6 and Comparative Example 5.

It can be seen from this that the values of $I_{(222)}/I_{(311)}$ of Examples 3 to 6 are 68%

EXPERIMENTAL EXAMPLE 7

Raman Spectroscopy

Raman spectroscopy was conducted in order to analyze the structural properties of the sulfide-based solid electrolytes according to Examples 3 to 6 and Comparative Example 5. The measurement method is substantially the same as in Experimental Example 2 and thus a description thereof is omitted. The results are shown in FIGS. 11A and 11B. FIG. 11A shows a Raman spectrum of each sulfide-based solid electrolyte and FIG. 11B shows a Raman shift and a full width at half maximum (FWHM) of each sulfide-based solid electrolyte.

Referring to FIG. 11A, it can be seen that the peaks of Examples 3 to 6 have $PS_4^{3-}$ ion cluster positions distinguished from those of Comparative Example 5. Specifically, Examples 3 to 6 have a wave number of the peak of $PS_4^{3-}$, of 426 cm$^{-1}$ to 429.5 cm$^{-1}$.

It can be seen from the results of Examples 3 to 6 and Comparative Examples 1 to 3 of FIG. 11B that, as the value of b in Formula 2 increases, the full width at half maximum (FWHM) of the peak of $PS_4^{3-}$ increases and the full width at half maximum is 9.3 cm$^{-1}$ to 12 cm$^{-1}$ in Examples 3 to 6.

EXPERIMENTAL EXAMPLE 8

NMR Analysis

NMR analysis was conducted in order to evaluate chemical changes to the sulfide-based solid electrolytes according to Examples 3 to 6 and Comparative Example 5. The measurement method is substantially the same as in Experimental Example 2 and thus a description thereof is omitted.

FIG. 12A is a $^7$Li-NMR graph of each sulfide-based solid electrolyte and FIG. 12B shows the full width at half maximum of each sulfide-based solid electrolyte.

As can be seen from FIGS. 12A and 12B, the full widths at half maximum of Examples 3 to 6 are positioned within the region ranging from 0.515 ppm to 0.530 ppm.

In addition, as chlorine is added, the position of the main peak was shifted toward a lower ppm and the shift was found to be within a region from −5.77 ppm to −5.16 ppm. In addition, additional peaks were observed on both sides of the main peak, and these peaks were also shifted, specifically, peaks added at a low ppm were shifted toward a lower ppm and peaks added at a high ppm were shifted toward a higher ppm. At this time, it was found that the shift of the right peak ranged from 15 ppm to 20 ppm and the shift of the left peak ranged from −33 ppm to −25 ppm.

FIG. 13A is a $^{31}$P-NMR graph of each sulfide-based solid electrolyte and FIG. 13B is a bar graph showing the result of quantitative analysis of the ratio of each peak of FIG. 7A.

As can be seen from FIGS. 13A and 13B, three main peaks are found in Examples 3 to 6. The main peak found at about 75 ppm is designated as "Peak 1", the main peak found at about 77 ppm is designated as "Peak 2", the main peak found at about 79 ppm is designated as "Peak 3", the main peak found at about 80 ppm is designated as "Peak 4", and the main peak found at about 82 ppm is designated as "Peak 5".

The following Table 7 shows the values obtained by quantitative analysis of the ratio of each peak found in each sulfide-based solid electrolyte.

TABLE 7

| Item | b in Formula 2 | 31P-NMR peak area ratio [%] | | | | |
|---|---|---|---|---|---|---|
| | | Peak 1 | Peak 2 | Peak 3 | Peak 4 | Peak 5 |
| Comparative Example5 | 1 | 10.56 | 29.44 | 60 | 0 | 0 |
| Example3 | 1.3 | 16.01 | 37.82 | 46.17 | 0 | 0 |
| Example4 | 1.6 | 20.23 | 30.71 | 49.06 | 0 | 0 |
| Example5 | 1.9 | 31.82 | 30.24 | 37.94 | 0 | 0 |
| Example6 | 2.2 | 34.52 | 26.49 | 38.99 | 0 | 0 |

As can be seen from this, in the sulfide-based solid electrolytes of Examples 3 to 6, the area ratios of three main peaks found in the $^{31}$P-NMR spectrum were 15%<Peak 1<35%, 25%<Peak 2<38%, and 38%<Peak 3<50%, respectively.

As apparent from the foregoing, the sulfide-based solid electrolyte having a novel composition with high lithium ion conductivity according to the present invention has a considerably high lithium ion conductivity of about 10 mS/cm.

Accordingly, an all-solid-state battery having excellent charge/discharge efficiency and high output can be obtained using the sulfide-based solid electrolyte having high lithium ion conductivity according to the present invention.

The effects of the present invention are not limited to those mentioned above. It should be understood that the effects of the present invention include all effects that can be inferred from the description of the present invention.

The lithium ion-conducing sulfide-based solid electrolytes according to the present invention can be used in all electrochemical cells that use solid electrolytes. Specifically, the present invention may be applied to various fields and products such as energy storage systems using secondary batteries, batteries for electric vehicles or hybrid electric vehicles, and portable power supply systems for unmanned robots or the Internet of Things.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A sulfide-based solid electrolyte comprising a lithium element (Li), a phosphorus element (P), a sulfur element (S) and a halogen element (X), and comprising a crystal phase having an argyrodite crystal structure,
wherein a molar ratio (X/P) of the halogen element (X) to the phosphorus element (P) is higher than 1,
three main peaks are found in a $^{31}$P-NMR spectrum,
the three main peaks comprise Peak 1 found at about 75 ppm, Peak 2 found at about 77 ppm and Peak 3 found at about 79 ppm, and
area ratios of the three main peaks are 42%<Peak 1<60%, 21%<Peak 2<28%, and 12%<Peak 3<31%, respectively.

2. The sulfide-based solid electrolyte according to claim 1, wherein the sulfide-based solid electrolyte comprises a compound represented by the following Formula 1:

$$Li_{7-a}PS_{6-a}X_a$$ [Formula 1]

wherein X is a halogen element selected from the group consisting of chlorine (Cl), bromine (Br), iodine (I) and a combination thereof, and a satisfies 1<a<2.5.

3. The sulfide-based solid electrolyte according to claim 2, wherein the sulfide-based solid electrolyte has major peaks at 2θ=26°±1.00°, 2θ=30°±1.00°, and 2θ=32°±1.00° when measuring X-ray diffraction patterns using CuKα rays, and
a 2θ value of each peak increases by 0.5° or less as a increases.

4. The sulfide-based solid electrolyte according to claim 2, wherein, as a increases, a full width at half maximum (FWHM) of a peak of $PS_4^{3-}$ increases,
wherein the full width at half maximum is 11.0 cm$^{-1}$ to 12.5 cm$^{-1}$.

5. The sulfide-based solid electrolyte according to claim 4, wherein the sulfide-based solid electrolyte has a wave number of the peak of $PS_4^{3-}$, of 429 cm$^{-1}$ to 430 cm$^{-1}$.

6. The sulfide-based solid electrolyte according to claim 2, wherein, in a $^7$Li-NMR spectrum, a full width at half maximum of a main peak decreases as a increases and the full width at half maximum is within a range of 0.4 ppm to 0.5 ppm.

7. The sulfide-based solid electrolyte according to claim 1, wherein the sulfide-based solid electrolyte comprises a compound represented by the following Formula 2:

$$Li_6PS_5X_b$$ [Formula 2]

wherein X is a halogen element selected from the group consisting of chlorine (Cl), bromine (Br), iodine (I) and a combination thereof, and b satisfies 1<b<2.5.

8. The sulfide-based solid electrolyte according to claim 7, wherein the sulfide-based solid electrolyte has major peaks at 2θ=26°±1.00°, 2θ=30°±1.00°, and 2θ=32°±1.00° when measuring X-ray diffraction patterns using CuKα rays, and
a 2θ value of each peak increases by 0.2° or less as b increases.

9. The sulfide-based solid electrolyte according to claim 7,
wherein the sulfide-based solid electrolyte has major peaks at 2θ=26°±1.00°, 2θ=30°±1.00°, and 2θ=32°±1.00° when measuring X-ray diffraction patterns using CuKα rays,
as b increases, a diffraction intensity ratio [$I_{(222)}/I_{(311)}$] decreases, wherein $I_{(311)}$ represents a diffraction intensity of the peak at 2θ=30°±1.00° and $I_{(222)}$ represents a diffraction intensity of the peak at 2θ=32°±1.00°, and the diffraction intensity ratio [$I_{(222)}/I_{(311)}$] is 68% to 78%.

10. The sulfide-based solid electrolyte according to claim 7, wherein, as b increases, a full width at half maximum (FWHM) of a peak of $PS_4^{3-}$ obtained by Raman spectroscopy increases and the full width at half maximum is 9.3 cm$^{-1}$ to 12 cm$^{-1}$.

11. The sulfide-based solid electrolyte according to claim 10, wherein the sulfide-based solid electrolyte has a wave number of the peak of $PS_4^{3-}$, of 426 cm$^{-1}$ to 429.5 cm$^{-1}$.

12. The sulfide-based solid electrolyte according to claim 7, wherein, in a $^7$Li-NMR spectrum, a full width at half maximum of a main peak is within a range of 0.515 ppm to 0.530 ppm.

13. The sulfide-based solid electrolyte according to claim 7, wherein three main peaks are found in a $^{31}$P-NMR spectrum and area ratios of the three main peaks are 15%<Peak 1<35%, 25%<Peak 2<38% and 38%<Peak 3<50%, respectively.

14. A method for preparing a sulfide-based solid electrolyte comprising:
preparing a mixture comprising lithium sulfide ($Li_2S$), diphosphorus pentasulfide ($P_2S_5$) and lithium halide (LiX);
pulverizing the mixture; and heat-treating the pulverized mixture,
wherein the sulfide-based solid electrolyte comprises a lithium element (Li), a phosphorus element (P), a sulfur element (S) and a halogen element (X), and comprises a crystal phase having an argyrodite crystal structure,
wherein a molar ratio (X/P) of the halogen element (X) to the phosphorus element (P) is higher than 1,
three main peaks are found in a 31P-NMR spectrum,
the three main peaks comprise Peak 1 found at about 75 ppm, Peak 2 found at about 77 ppm and Peak 3 found at about 79 ppm, and
area ratios of the three main peaks are 42%<Peak 1<60%, 21%<Peak 2<28%, and 12%<Peak 3<31%, respectively.

15. The method according to claim 14, wherein the sulfide-based solid electrolyte comprises a compound represented by the following Formula 1 or 2:

$$Li_{7-a}PS_{6-a}X_a \quad \text{[Formula 1]}$$

wherein X is a halogen element selected from the group consisting of chlorine (Cl), bromine (Br), iodine (I) and a combination thereof, and a satisfies 1<a<2.5, $$Li_6PS_5X_b \quad \text{[Formula 2]}$$

wherein X is a halogen element selected from the group consisting of chlorine (Cl), bromine (Br), iodine (I) and a combination thereof, and b satisfies 1<b<2.5.

16. The method according to claim 14, wherein the mixture comprises 44 mol % to 50 mol % of lithium sulfide, 9 mol % to 15 mol % of phosphorus pentasulfide, and 38 mol % to 43 mol % of lithium halide.

17. The method according to claim 14, wherein the mixture further comprises elemental sulfur (S),
wherein the mixture comprises 35 mol % to 55 mol % of lithium sulfide, 9 mol % to 15 mol % of phosphorus pentasulfide, 3 mol % to 15 mol % of elemental sulfur and 30 mol % to 50 mol % of lithium halide.

18. The method according to claim 14, wherein the mixture is pulverized by applying a G-force of 40 G or more to the mixture.

19. The method according to claim 14, wherein the pulverized mixture is heat-treated at a temperature of 300° C. to 600° C. for 10 seconds to 10 hours.

* * * * *